April 8, 1952 — J. C. YOUNG — 2,592,096
TIRE CHAIN APPLYING TOOL
Filed Feb. 9, 1948
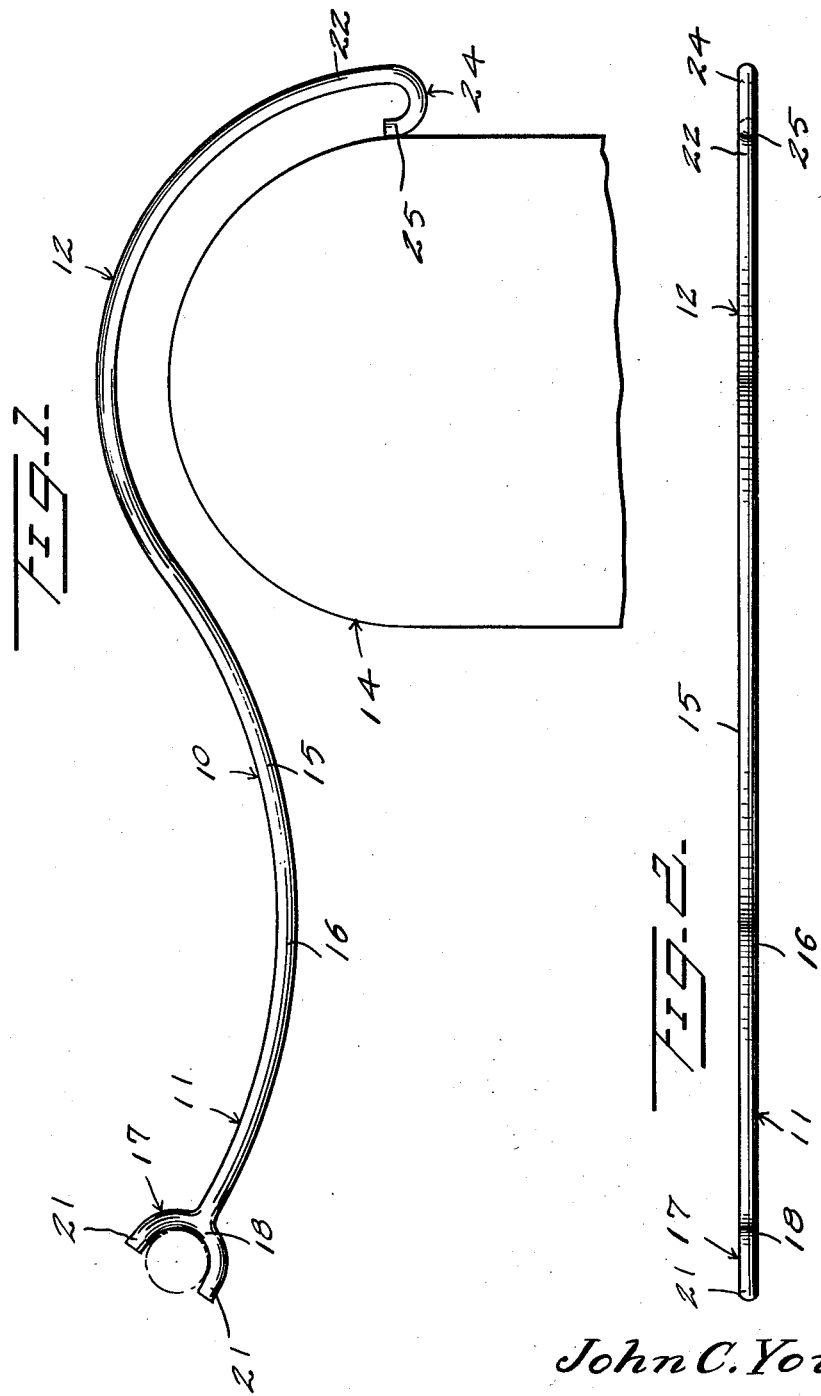
Inventor
John C. Young
By
Kimmel & Crowell Attys.

Patented Apr. 8, 1952

2,592,096

UNITED STATES PATENT OFFICE 2,592,096

TIRE CHAIN APPLYING TOOL

John C. Young, Pittsburgh, Pa.

Application February 9, 1948, Serial No. 7,029

1 Claim. (Cl. 81—15.8)

This invention relates to tire chain applying tools and more particularly to a tire chain applying tool for use in applying and removing a tire chain as set forth in my copending application, Serial No. 765,466, filed August 1, 1947, now abandoned, for a tire chain.

It is an object of this invention to provide a tool of the kind to be more particularly described hereinafter, for applying a tire chain on a tire and for removing the chain. The tool is particularly adapted for use on a tire chain having a resilient split ring on one side of the tire, and a pivotal sectional ring on the other side having the cross chains connected therebetween.

Another object of this invention is to provide a dual purpose tool of this kind having a fork on one end and a hook on the other so that the necessary tools for such a chain may be embodied in one unit, thus precluding the possibility of misplacing some of the tools and rendering the chains useless for want of the necessary applying and removing tools.

With the above and other objects in view, my invention consists in the arrangement, combination and details of construction disclosed in the drawings and specification, and then more particularly pointed out in the appended claim.

In the drawings,

Figure 1 is a side elevation of a tire chain applying and removing tool constructed according to an embodiment of this invention, Figure 2 is a bottom plan view thereof.

Referring to the drawings, the numeral 10 designates generally a tire chain applying and removing tool especially designed for the application and removal of a tire chain as disclosed in my copending application, Serial No. 765,466, filed August 1, 1947, for a tire chain. The tire chain tool 10 is designed for engagement at one end as 11 with the resilient split ring of the tire chain which is adapted to be disposed on the inner side of the tire.

The resilient split ring as described in the above identified application is formed of a circular rod to which are attached the cross chains which extend across the outer peripheral surface of the tire 14.

The tool 10 is designed at end 11 to push the resilient split ring into place on the inner side of the tire so that it will not be necessary to crawl below the car or reach between the tire and fender for inserting the resilient split ring into place.

The tool 10 is formed of an elongated bar 15 which is formed with a downwardly opening concavo-convex arcuate end 12, which is adapted to extend over and partially engage with the contour of the cross section of the tire 14.

A reverse concavo-convex bowed upwardly opening arc 16 is disposed at the end of the rod 15 opposite from the end 12. The arcuate end 16 is formed on an arc substantially twice the radius of the arc of the end 12 and is concave upwardly. A tire chain pushing member 17 is fixed to or carried by the end 16 of the tool 10. The arcuate ends of the tool 10 and their engaging members 17 and 24 are coplanar and each end is formed with a tire engaging member complementary to the other, i. e., one member is provided for applying the chain and the other member for removing the chain from the tire.

The member 17 is formed for engagement with the resilient ring of the tire chain for pushing the ring into place behind a mounted tire. The tire chain engaging member 17 is formed of a U-shaped or bifurcated body 18 of circular cross section having the bight thereof fixed to or formed on the outer end 11 of an upwardly bowed portion 16 of the tool 10, the bight being interiorly of substantially semi-circular configuration.

The arms 21 of the member 17 are substantially parallel to each other and to the extension 11. The bight between the side members 21 is semi-circular to tiltably engage with the contour of the resilient ring to permit limited play as needed, the circular cross sectional configuration of the body also permitting limited play in the transverse plane.

The other extreme end 22 of the tool 10 is formed with a hook 24 for removing the tire chain from the tire. The hook 24 is formed as a reverted terminal end of the rod 15, at the end of the arc 12 and opens upwardly and inwardly thereof. The bill 25 of the hook 24 is formed of a contour to suitably engage about the resilient ring for pulling the resilient ring sideways outwardly over the tire 14.

When one of the tire chain engaging members 17 or 24 is in use, the other end provides a suitable handle for manipulating the tool for the use of the engaging member 17 or 24.

I do not mean to confine myself to the exact details of construction herein disclosed, but claim all variations falling within the purview of the appended claim.

What I claim is—

In a tire chain applying tool, an elongated substantially S-shaped handle portion of circular cross section at least one portion of which is of a radius of curvature sufficient to overlie the cross sectional configuration of a vehicle tire, and an applying member for tire chains at the extremity of said one portion, said member comprising a bifurcated element co-planar with said S-shaped handle, the legs of which are circular in cross section and the bight of which is semi-circular for a universal tilting engagement with a ring of the chain to be applied.

JOHN C. YOUNG.

REFERENCES CITED

The following references are of record in the file of this patent:

UNITED STATES PATENTS

| Number | Name | Date |
|---|---|---|
| 674,926 | Macphail | May 28, 1901 |
| 1,373,348 | Nation | Mar. 29, 1921 |
| 1,567,025 | Allison | Dec. 29, 1925 |
| 2,222,891 | Ransom | Nov. 26, 1940 |
| 2,426,763 | Curtis | Sept. 2, 1947 |

FOREIGN PATENTS

| Number | Country | Date |
|---|---|---|
| 499,260 | Great Britain | Jan. 20, 1939 |